United States Patent [19]

Curtis

[11] Patent Number: 4,753,586
[45] Date of Patent: Jun. 28, 1988

[54] APPARATUS FOR FORMING COMPOSITE PRODUCTS

[75] Inventor: Cass V. Curtis, Dover, N.H.

[73] Assignee: Ex-Cell-O Corporation, Walled Lake, Mich.

[21] Appl. No.: 24,971

[22] Filed: Mar. 12, 1987

[51] Int. Cl.⁴ ............................................. B28B 23/00
[52] U.S. Cl. .................................. 425/117; 264/46.6; 264/261; 264/278; 425/125; 425/127; 425/412; 425/444
[58] Field of Search .............. 264/275, 278, 279, 46.4, 264/46.6, 261; 425/4 R, 817 R, 116, 117, 125, 127, 554, 556, 438, 444, 412

[56] References Cited

U.S. PATENT DOCUMENTS

| | | |
|---|---|---|
| 3,363,040 | 1/1968 | Katashi-Aoki .................. 264/278 |
| 3,914,086 | 10/1975 | Hujik .............................. 425/444 |
| 4,058,284 | 11/1977 | Rath ............................. 425/817 R |
| 4,106,745 | 8/1978 | Carrow ........................... 264/278 |
| 4,420,447 | 12/1983 | Nakashima ....................... 264/46.4 |
| 4,519,567 | 5/1985 | Rautenberg ...................... 264/279 |

Primary Examiner—Jay H. Woo
Assistant Examiner—C. Scott Bushey
Attorney, Agent, or Firm—John C. Evans

[57] ABSTRACT

An apparatus for making composite plastic product includes a mold insert with locating boss formations preformed from high strength plastic having openings formed therethrough; and wherein the insert is configured to be located on a mold cover which carries a locking device to hold the insert in place and wherein the locking device includes automatically operated knock-out means that engage the boss to separate a molded part from the lid when the locking device is released.

6 Claims, 2 Drawing Sheets

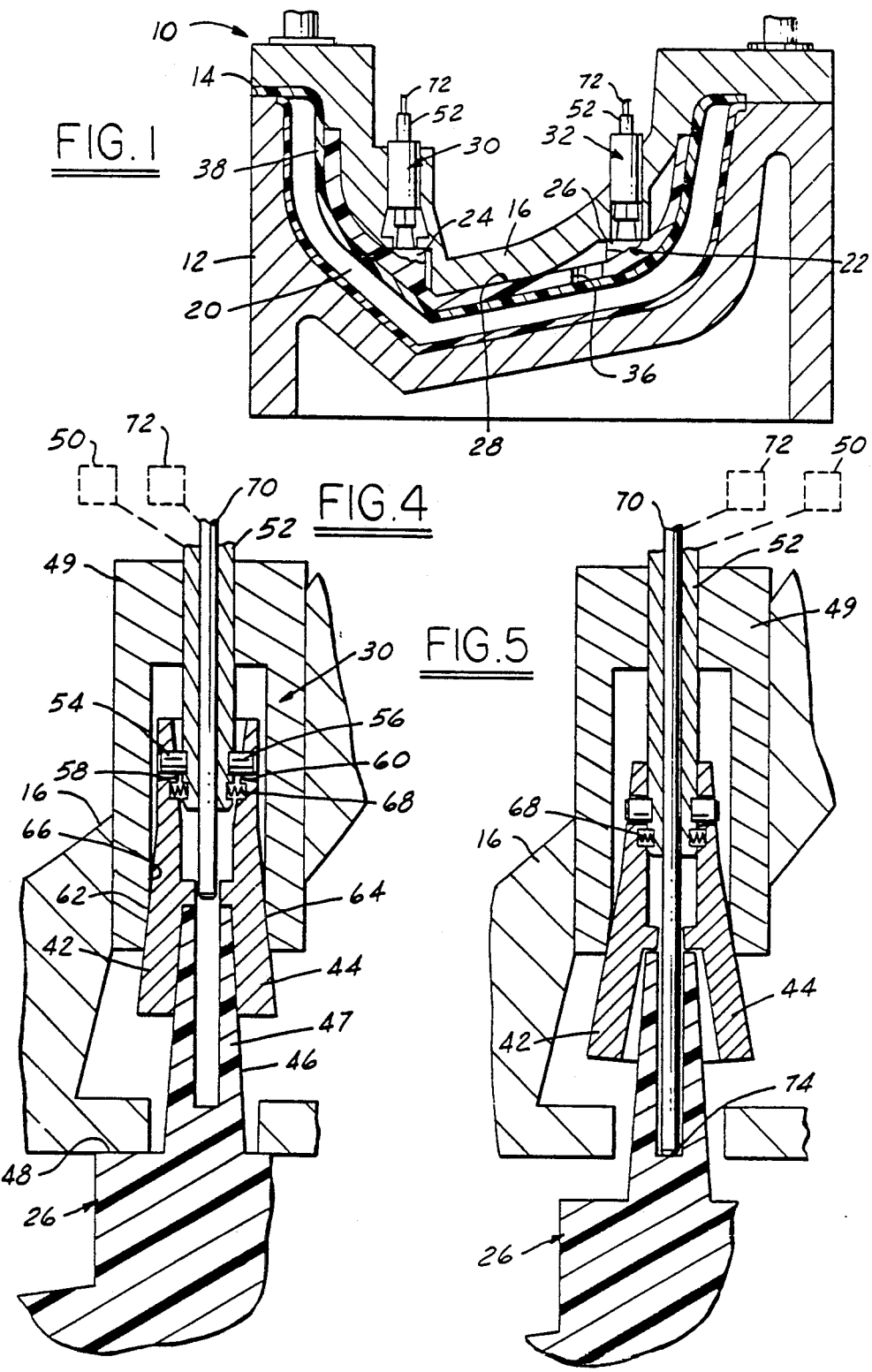

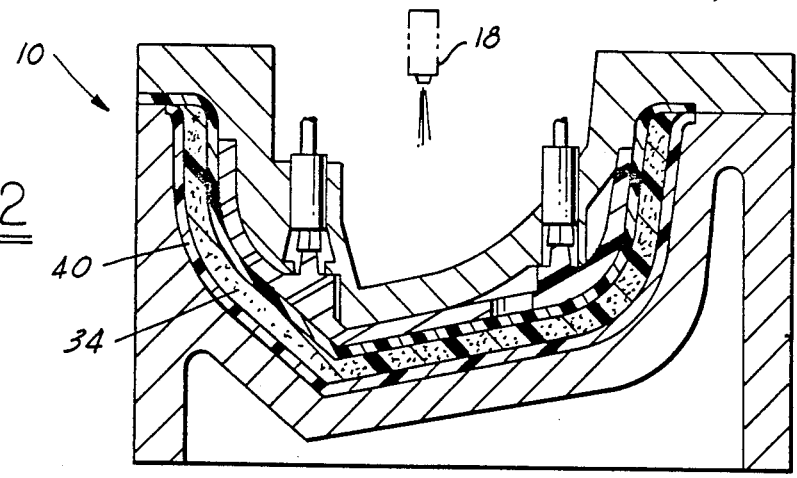
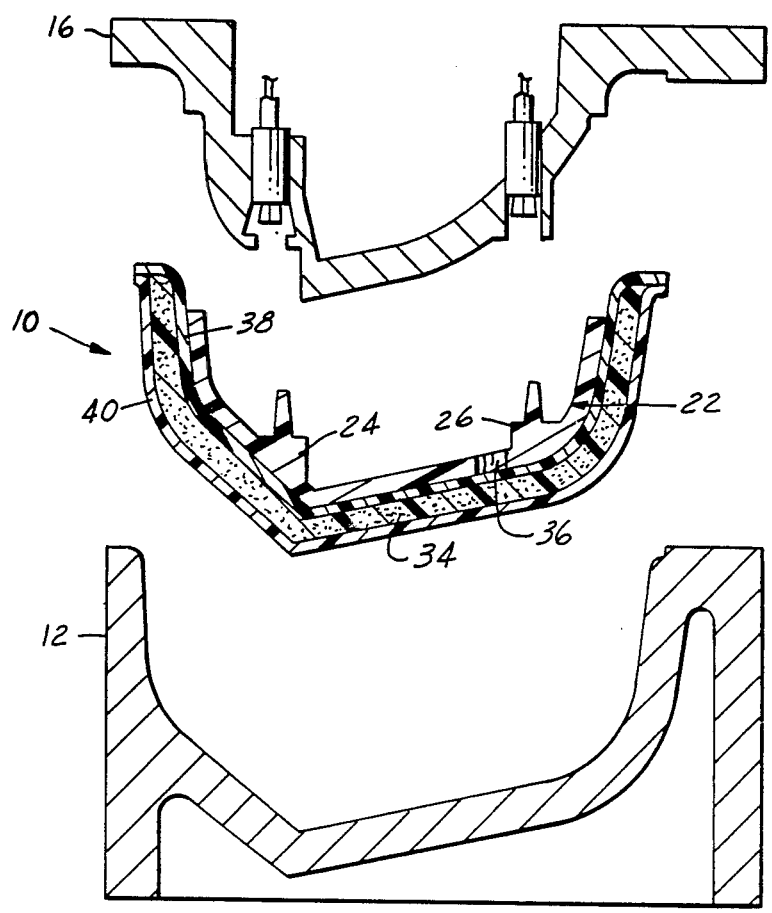

APPARATUS FOR FORMING COMPOSITE PRODUCTS

BACKGROUND OF THE INVENTION AND PRIOR ART

This invention relates to molded plastic products and more particularly to an apparatus for manufacturing such products including means for locating a structural load support insert member in a mold wherein the locating means includes means to separate the load support insert member from a mold part.

In the past it has been recognized that it is desirable to locate a load support or insert member in a mold to form a composite plastic product by a foaming process in which polyurethane material is foamed with respect to the insert.

One such method is set forth in U.S. Pat. No. 4,228,115 issued Oct. 14, 1980 to Gardner for Method of Making a Horn Pad. In this method a horn switch assembly is covered by a plastic film and then the assembly is foamed to form a plastic product with a load support insert, a covering film and a layer of urethane foam. While suitable for its intended purpose, the method of the '115 patent requires that the inserts be fabricated as separate components used in a second manufacturing step which covers the insert with the film and then moves the "covered insert" to the mold to carry out a foam operation.

U.S. Pat. Nos. 4,420,447 and 4,477,504 both disclose instrument panel constructions and methods for foaming material with respect to a load support insert. In both cases, however, the insert is supported on a mold cavity part and then the part is lifted from the mold cavity in a second manufacturing step.

U.S. Pat. No. 449,945 discloses use of transverse holding strips and manually releasable bolts to hold an insert in place. The holding strips, however, became part of the product. U.S. Pat. No. 1,592,671 discloses a mold reinforcing having tapered spacing lugs. The lugs, however, are not extended beyond the mold to be engaged by combination locating and part release mechanism. U.S. Pat. No. 3,871,060 disclose a method for manufacturing plastic mold parts in which the mold parts have projections defining passages for flow of injection molding material. The use of high strength preforms or inserts is not disclosed. U.S. Pat. No. 4,519,567 discloses the use of mold pins to support a reinforcing ring. None of these references disclose an insert with boss formations configured for engagement with a combination locating and release mechanism.

SUMMARY OF THE INVENTION

An object of the present invention is to provide an improved apparatus for molding plastic products with a structural load supporting insert having rear locating bosses for mounting a final assembly. In particular, the apparatus includes an insert of the aforesaid type wherein the bosses have a mounting pin directed through the mold so as to be carried and located by locating means on the mold which secures the backside of the insert to a mold lid and wherein the locating means includes a release pin operative to engage the boss to separate a composite plastic product from the mold when the mounting pin is unlocked.

Another object of the present invention is to provide an improved apparatus for manufacturing interior trim parts for automobiles in which a load support member or insert is formed of injection molded plastic with support pins that are configured to be clamped to a mold lid during the plastic molding process. Once the molded material is cured, the support pins are engageable by knock-out pins to release the molded insert preform from the mold.

The objects are achieved in one process which includes apparatus having (a) an insert preform of structural plastic including a rear boss on the preform which is held by injection mold tooling to locate the insert in a bowl loaded mold cavity of the tooling; (b) the mold tooling located on the mold cover or lid of a foam station; and (c) pouring apparatus for directing foam precursors into the foam station mold cavity to cause the material to foam against the insert and the bosses configured such that knock-out pins on the lid will engage the backside of the preform so as to release the finished product from the mold.

These and other objects of the invention will be more apparent when taken in conjunction with the following detailed description of the invention along with reference to the accompanying drawings.

BRIEF DESCRIPTION OF THE DRAWINGS

FIG. 1 is a cross-sectional view of an insert in the present invention located with respect to the mold halves of a foam molding station;

FIG. 2 is cross-sectional view of the apparatus of FIG. 1 shown in a foam molding position;

FIG. 3 is a cross-sectional view of the apparatus of FIG. 1 with the finished product in its product release position;

FIG. 4 is an enlarged cross-sectional view of the insert support and release apparatus of the present invention shown in a locked position; and FIG. 5 is a view of the apparatus of FIG. 4 in a release position.

DETAILED DESCRIPTION OF THE PREFERRED EMBODIMENT

Referring now to FIG. 1, a reaction injection molding (RIM) apparatus 10 is illustrated which includes a split die of the type mounted in known RIM mold presses. A mold cavity member 12 has a face 14.

A mold cover 16 opens to allow a pour spout 18 to be disposed for flow of RIM material into the mold cavity 20.

A plastic load bearing insert 22 has guide or reference shouldered bosses 24,26 in the back 28 of the insert 22. The cover 16 includes locking devices 30,32 to locate the preform 22 within mold cavity 20. When the mold is open and the insert 22 is bowl loaded in the cavity 20 precursors for a foam material which are poured through the spout 18 react in the cavity 20. The closed cover 16 forms a space into which the foam precursors are allowed to expand in a known manner to fill the space with a suitable layer 34 of foam material such as foamed urethane as shown in FIG. 2.

In an illustrated arrangement, the insert 22 has holes 36 covered by film 38. Cavity 20 is covered by a layer 40 of vinyl which defines the outer cover of a finished composite as shown in FIG. 3.

In accordance with the present invention, each locking device 30,32 includes locking jaws 42,44 which engage a tapered surface 46 on a mounting pin 47 which extends outwardly of each boss 24,26. The jaws 42,44 are held in a locked position as shown in FIG. 4 to draw the insert 22 into a seated position against the lid or cover 16 at land surfaces 48. Thus, the bosses 24,26 serve to lock and locate the insert 22 in the foaming mold during part manufacture.

The locking devices 30,32 each have a hollow housing 49 carried on the lid 16 as an integral part of the mold.

The jaws 42,44 are connected to an operating cylinder 50 by means a rod 52 having crossed ends 54,56 on its inboard end. The ends 54,56 are located in slots 58,60 in the upper end of each of the jaws 42,44. The slots 58,60 are configured so that the jaws 42,44 are free to pivot from a locked position in FIG. 4. The outer surfaces 62,64 of each jaw engages the inner surface 66 of housing 49 to hold the jaws 42,44 locked against the tapered surface 46 of pin 47 when the rod 52 is extended from housing 49. Conversely, when rod 52 is retracted into the housing 49 the jaws 42,44 are spread apart by springs 68 to assume the release position of FIG. 5.

The locking devices 30,32 further include a knock-out pin 70 which is extended by cylinder 72 to push on the bottom end 74 of the shouldered bosses 24,26 and thereby release the finished part. The shouldered bosses 24,26 serve the dual function of a vehicle assembly locator surface for attachment to structural members of the vehicle.

As shown in FIGS. 1 and 2, the provision of an insert 22 with such taper configured bosses allows for bowl loading of a shell 38 and the insert 22 while doing away with hinges of prior art pour mold systems.

The foam molding process and release results in good adhesion of the foam layer 34 to the preform insert 22. The apparatus can be used in a process which lends itself to automated, in-line RIM mold systems.

What is claimed:

1. Apparatus for manufacturing a composite plastic structure comprising: a load supporting insert including rear bosses formed thereon; reaction injection mold means including a cavity member and a cover removably mounted on the cavity member for forming a cavity for said load supporting insert, said cover including locking devices integral therewith, said locking devices including gripping means for releasably gripping the rear bosses to locate the insert in place in the cavity member and bond said insert to a plastic material filling said cavity member.

2. In the apparatus of claim 1, said rear bosses having tapered pins thereon, said gripping means including movable jaws for releasably gripping said tapered pins to secure said bosses to said cover during molding.

3. In the apparatus of claim 2, said locking devices further including knock-out pin means engageable with said bosses when said jaws are released for separating a finished part from said cover.

4. Apparatus for manufacturing a preform to be used in the manufacture of composite plastic structures comprising: a load supporting insert including rear bosses formed thereon; reaction injection mold means including a cavity member and a cover bowl loadable into said cavity member for forming a cavity for said load supporting insert, said cover including locking devices integrally formed thereon, said rear bosses including an extension thereon, said locking devices including a housing for receiving said extension when said cover is bowl loaded on said cavity member, and gripping means in said housing operable for releasably gripping said extension to locate and lock the insert in place in the cavity member.

5. In the apparatus of claim 4, said extension having tapered surfaces and a shoulder thereon, said locking means including jaws engageable with said tapered surfaces, and means on said cover engageable with said shoulders when said jaws are engaged for locating said insert on said cover.

6. In the apparatus of claim 5, said locking devices further including knock-out pin means engageable with said bosses when said jaws are released to separate a mold part from said cover.

* * * * *